United States Patent [19]

Rowland

[11] Patent Number: 5,062,184

[45] Date of Patent: Nov. 5, 1991

[54] CLIP FOR HOLDING ELONGATED DEVICES

[75] Inventor: David E. Rowland, San Diego, Calif.

[73] Assignee: Janice L. Rowland, Imperial Beach, Calif.

[21] Appl. No.: 575,867

[22] Filed: Aug. 31, 1990

Related U.S. Application Data

[63] Continuation-in-part of Ser. No. 363,609, Jun. 8, 1989, and Ser. No. 375,664, Jul. 8, 1989, each is a continuation-in-part of Ser. No. 176,670, Apr. 1, 1988, abandoned.

[51] Int. Cl.$^5$ .............................................. B65D 63/00
[52] U.S. Cl. .............................. 24/16 PB; 24/30.5 R; 24/17 AP; 24/300; 248/74.3
[58] Field of Search .................. 24/16 PB, 17 AP, 19, 24/300; 248/74.3, 51

[56] References Cited

U.S. PATENT DOCUMENTS

| | | | |
|---|---|---|---|
| 2,440,012 | 4/1948 | Haver | 24/30.5 R |
| 3,174,787 | 3/1965 | Kolman | 24/300 |
| 3,197,830 | 8/1965 | Hoadley . | |
| 3,632,071 | 1/1972 | Cameron | 248/74.3 |
| 3,721,750 | 3/1973 | Countryman . | |
| 4,458,385 | 7/1984 | Espinoza | 24/17 AP |
| 4,510,650 | 4/1985 | Espinoza | 24/17 AP |
| 4,752,054 | 6/1988 | Jonsson | 248/74.3 |
| 4,766,651 | 8/1988 | Kobayashi et al. | 24/16 PB |
| 4,991,265 | 2/1991 | Campbell et al. | 24/16 PB |

FOREIGN PATENT DOCUMENTS

| | | |
|---|---|---|
| 2012300 | 9/1971 | Fed. Rep. of Germany . |
| 1332600 | 6/1963 | France .................. 24/16 PB |
| 2191634 | 2/1974 | France . |
| 2352192 | 12/1977 | France . |
| 1056740 | 1/1967 | United Kingdom . |

Primary Examiner—Victor N. Sakran
Attorney, Agent, or Firm—William D. Hall

[57] ABSTRACT

A clip for holding elongated devices such as wire, rope, tools such as screwdrivers, is provided. The clip is in two pieces. One piece is a flexible elastic elongated member with a series of spaced-apart beads near one end. The other piece is a molded plastic device having a base that has provision for attaching the base to a wall, post or pipe. Four side walls project from the base. Two opposed side walls have V-shaped cavities in them for receiving the elongated device. The beaded elongated member extends between the other two walls. The spaced beads enable the elongated member to be placed under tension as it crosses over the elongated device. The elongated member presses the elongated device toward the base and toward the walls of the V-shaped cavities. Thus the elongated device is held firmly in the clip.

10 Claims, 2 Drawing Sheets

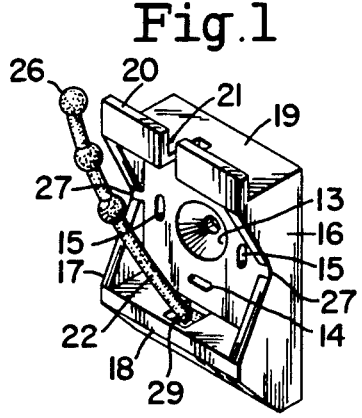
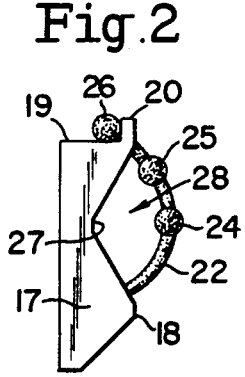
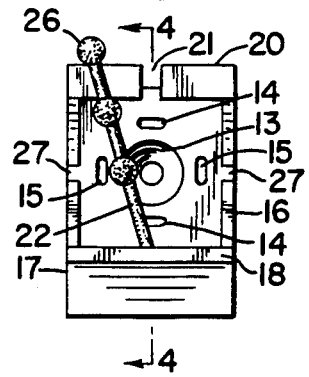
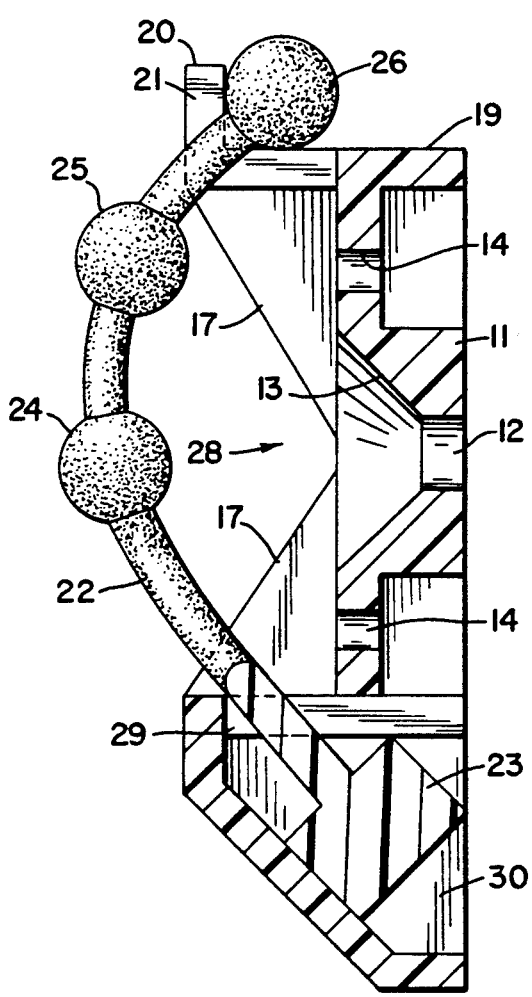
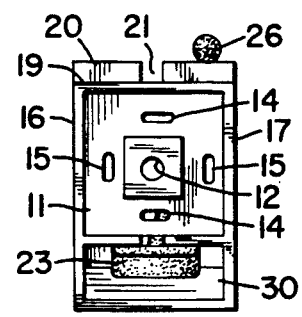
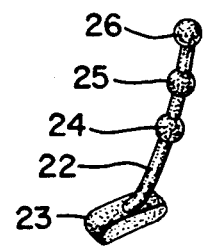

CLIP FOR HOLDING ELONGATED DEVICES

This application is a continuation-in-part of my prior co-pending applications Ser. No. 363,609 filed June 8, 1989 and Ser. No. 375,664, filed July 8, 1989. Those two applications were continuation-in-part of my prior applications in part of my prior application Ser. No. 176,670 filed Apr. 1, 1988 now abandoned.

BACKGROUND OF THE INVENTION

Clips for holding elongated devices such as wire, rope, etc. are known. For example, Jonsson U.S. Pat. No. 4,752,054, has a base that may be supported by the wall of a building. A flexible tongue forms a ring that holds a coil of wire. U.S. Pat. No. 4,510,650 to Espinoza has a curved surface against which a bundle of wire is held by a strap.

German patent 2,012,300 to Lefnaer discloses a lace type of binding device for holding the mouth of a plastic sack closed. That device has an elongated member with enlargements on it for closing the sack.

French publication No. 2,352,192 of Dec. 16, 1977, also discloses a tie cord having a series of enlargements one of which is in engagement with a socket.

SUMMARY OF THE INVENTION

The invention is a clip that has a base and four walls projecting from the base. Two opposing spaced walls have V-shaped cavities for receiving an elongated device to be held by the clip. The third and fourth spaced side walls support an elongated member connected at one end to the third one of those side walls and the other end of the elongated member is connected to the fourth one of said side walls. The elongated member is flexible, is elastic, has memory, and includes a series of beads near one end. The beads latch into a socket in one of the side walls thus permitting the tension on the elongated member to be adjusted by changing the bead that is in the socket. The elongated member overlies and applies pressure onto an elongated device that is resting in said cavities, thereby pressing the elongated device toward the base and toward the walls of the cavities. The elongated device is firmly held in place.

BRIEF DESCRIPTION OF THE DRAWINGS

FIG. 1 is a perspective view of the clip comprising the invention, with the elongated member decoupled from its socket.

FIG. 2 is a left-side view of the clip of FIG. 1.

FIG. 3 is a front view of the clip of FIG. 1.

FIG. 4 is a sectional view of the clip of FIG. 1, taken along line 4—4 of FIG. 3.

FIG. 5 is a rear view of the clip of FIG. 1.

FIG. 6 is a perspective view of the elongated member which is part of the clip shown in FIGS. 1 to 5.

DETAILED DESCRIPTION OF THE INVENTION

Figure 7:
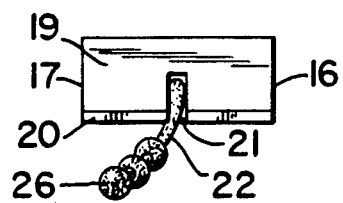
FIG. 7 is a top view of the clip of FIG. 1.

The clip of this invention, in its preferred form, is in two pieces although it could be made in one piece. One of the two pieces of the preferred from is shown in FIG. 6 where the flexible and elastic elongated member 22 has three beads 24, 25 and 26 near one end and the enlargement 23 near the other end. The other piece of the clip comprises the remaining parts 11 to 21 and 27 to 30. This second piece is made of molded plastic that is relatively rigid and maintains its shape while in use.

The molded plastic piece has a base 11 defining a hole 12 with a tapered inlet 13 so that the base 11 may be secured to a wall, post or the like with a screw. If, however, it is desired to secure the base 11 to a horizontal pipe a mounting strap may be passed through slots 14 and around the pipe. If the pipe is vertical, the slots 15 receive the strap.

The molded piece has side walls 16 and 17 extending forward from the base 11. A bottom side 18 is employed. The top side 19 has a vertical flange 20 having a slit or slot 21 for receiving a portion of member 22.

Each of the side walls 16 and 17 has a V-shaped cavity 28 in it, together with short vertical length 27 at the apex of the V-shaped opening 28. A hole 29 in wall 18 enables the elongated member 22, with bead 26 leading the way, to be slipped in series through holes 30 and 29. The hole 29 is large enough to enable the beads 24, 25 and 26 to pass therethrough, but small enough to prevent enlargement 23 from passing through.

Figure 8:
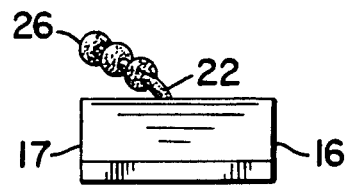
FIG. 8 is a bottom plan view of the clip of FIG. 1.
Figure 9:
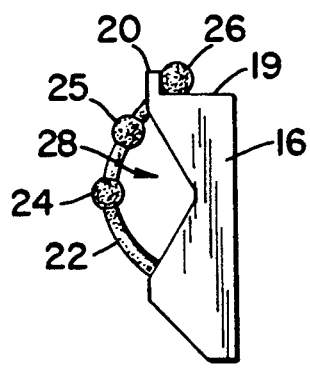
FIG. 9 is a right-side view of the clip of FIG. 1.
Figure 10:
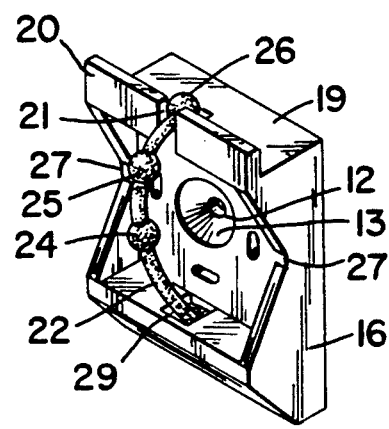
FIG. 10 is a perspective view of the clip of FIG. 1 with the elongated member coupled to its socket.

The clip of FIGS. 1 to 10 may be used to hold a great variety of elongated devices such as wire, cables, rope, tools such as screwdrivers, pencils, etc. The primary use, however is to hold wire.

The way the clip is used will now be described. If a straight piece of wire is to be held in the clip, the elongated member 22 is disconnected from flange 20 and moved out of the way. The piece of wire is then laid into the V-shaped cavities 28 so that it extends through the cavities 28 and the space between those cavities. The elastic elongated member 22 is pulled to place it under tension. While under tension the member 22 is moved across and in contact with the wire and then moved into slot 21 of flange 20. This causes member 22 or one of its beads (such as 24) to press the wire tightly against the side walls 16, 17 and the base 11. The wire is thus locked in place.

The invention can be used to hold not only a straight wire but a coil of wires. For example, if a long piece of wire is wound into a coil, the elongated member 22 may be inserted through the opening in the center of the coil. Then when one of the beds 24, 25 or 26 is secured behind flange 20 the coil will be held against the walls of the V-shaped cavities and against the base 11. Such a method of holding a coil is taught in my prior copending application Ser. No. 375,664, filed July 3, 1989 entitled Flexible Element Holder, a continuation-in-part of my earlier application Ser. No. 176,670, filed Apr. 1, 1988 and entitled Flexible Element Holder.

The fact that there are several beads 24, 25 and 26 enables the tension in the elongated member to be selected and it also permits the clip to apply to wires (or other elongated device) of different size. The elongated member 22 has sufficient elasticity to enable bead 24 to be placed behind flange 20.

The flexible elastic elongated member 22 including enlargement 23 and beads 24, 25 and 26 is made as follows: The starting material is Estane ™, a thermoplastic polyurethane produced by B. F. Goodrich Co. This material is fed into the injection mold at 430° F. This temperature is in contrast to the temperature usually employed for injection molding which is 230° to 285° F. The typical diameter of elongated member 22 may be 0.060 inches with the bead diameter 0.175 inches. This is smaller than is customary for injection molding of this type. The material is then subjected to vacuum draw to pull the material into the cavities of the mold. That is to say: the mold is an elongated one and is as long as the elongated member. The Estane material is fed in one end of the mold, and a vacuum is applied to the other end of the mold to make sure that the material fills the entire mold. After the material is molded it is post cured in a heated oven for 24 hours at 140° F. The resulting product has excellent memory characteristics,—that is after being stretched it returns to its original shape.

I claim to have invented:

1. A clip for holding elongated devices, comprising:
a base,
a first and second projections each of which projects outward from and transversely to said base,
both of said projections extending away from said wall in the same general direction,
each of said projections defining a cavity through which said elongated device may pass,
said projections being spaced from each other to thereby provide a space between said cavities,
said cavities being in general alignment with each other so that the elongated device may be positioned to extend through both cavities as well as the space between said cavities, and
means for firmly holding an elongated device that extends through and between said cavities comprising an elastic stretchable elongated member that extends transverse to an elongated device located in and between said cavities and which presses against the elongated device to hold it in place,
said elastic stretchable elongated member having at least two enlargements that are spaced from each other, one of which enlargements is positioned adjacent one side of an elongated device that extends through and between said cavities and the other of which enlargements is positioned adjacent the other side of the elongated device that extends through and between said cavities,
said means including connecting means on said base for connecting one of said enlargements of said elongated member to said base and for removably connecting the other of said enlargements of said elongated member to said base.

2. A clip for holding an elongated device, comprising:
a base,
side wall means comprising first and second side wall portions extending forwardly and away from said base,
each of said side wall portions defining a cavity through which the elongated device may pass,
said side walls portions being spaced from each other to thereby form a space between said cavities,
said cavities being generally aligned with each other so that an elongated device may extend through said cavities as well as through the space between said cavities, and
means for pressing an elongated device, that is between said cavities, toward said base to hold the elongated device in place, including:
a. an elastic stretchable elongated member and having spaced-apart enlargements along the same,
b. first mounting means connection one of said enlargements of said elongated member to said base,
c. second mounting means for removably connecting another enlargement of said elongated member, to said base,
d. said first and second mounting means being on opposite sides, respectively, of an elongated device, that is extending through said space; so that the elongated member will extend, while stretched, across the elongated device in a direction transverse to the direction of elongation of the elongated device and press the elongated device toward said base.

3. A clip as defined in claim 2, comprising:
said side wall means including a flange that extends parallel to said rear wall, said flange having a slot in it, said flange comprising said second mounting means,
said elongated member having an enlargement on it that is too big to pass through said slot, the portion of said elongated member enlargements being small enough to fit into said slot, so that said flange supports a portion of said elongated member.

4. A clip for holding an elongated device, comprising:
a base,
wall means extending forwardly from said base,
said wall means having first and second portions, said first and second portions having free outer ends,
each of said first and second portions having a cavity, each such cavity extending to the free outer end of the portion in which the cavity is located,
said cavities being in general alignment with each other so that an elongated device may extend through said cavities as well as through the space between said cavities,
an elongated member having first and second enlargements,
said elongated member being flexible, stretchable and elastic,
said wall means including third and fourth portions for positioning said elongated member transversely to an elongated device that extends through and between said cavities,
said third portion having means for holding one of said enlargements thereby connecting said elongated member to said base,
said fourth portion having means for holding the other of said enlargements thereby connecting said elongated member to said base,
at least one of said connections being a removable connection and comprising means so that the elongated member may be disconnected from said wall means at at least one of said enlargements to allow insertion of an elongated device into the space between said cavities and so that the elongated member may then be connected to said base to apply pressure pressing said elongated means toward said base for thus holding the elongated device in place.

5. A clip as defined in claim 4, comprising:
said fourth portion being integral with said base and extending away from said base to provide a free end of said fourth portion,
said fourth portion having a flange attached to its free end, said flange having a free end and a slit extending inward from said free end,
said elongated member having a portion small enough to enter said slit and also having at least one enlargement that will not pass through said slit, so that said flange comprises locking means for locking the elongated member to said flange.

6. A clip as defined in claim 5 in which said base defines at least one hole to enable the base to be secured to a support.

7. A clip as defined in claim 5, in which said third portion defines a hole big enough to allow a portion of said elongated member that is between two of said enlargements to pass therethrough, another of said enlargements being too big to pass through said hole, said third portion comprising means to connect said another enlargement to the third portion by preventing the passage of said another enlargement through said hole.

8. A clip as defined in claim 7, in which the clip is in only two pieces one of which is said elongated member and the other of which is the remainder of the clip.

9. A clip as defined in claim 7, comprising:
said third portion defining a pocket in said base, said third portion also defining an opening through which said elongated member and its enlargements may pass and also defining said hole through which one of said enlargements may not pass.

10. A clip as defined in claim 4, in which said cavities are V-shaped.

* * * * *